United States Patent
Moeys et al.

(10) Patent No.: US 12,549,868 B2
(45) Date of Patent: Feb. 10, 2026

(54) METHOD AND APPARATUS FOR CHARACTERIZING A DYNAMIC VISION SENSOR

(71) Applicants: Sony Group Corporation, Tokyo (JP); Sony Semiconductor Solutions Corporation, Atsugi (JP)

(72) Inventors: Diederik Paul Moeys, Stuttgart (DE); Peter Dürr, Stuttgart (DE)

(73) Assignees: SONY GROUP CORPORATION, Tokyo (JP); SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 31 days.

(21) Appl. No.: 18/565,532

(22) PCT Filed: May 31, 2022

(86) PCT No.: PCT/EP2022/064696
§ 371 (c)(1),
(2) Date: Nov. 30, 2023

(87) PCT Pub. No.: WO2022/258430
PCT Pub. Date: Dec. 15, 2022

(65) Prior Publication Data
US 2024/0259702 A1  Aug. 1, 2024

(30) Foreign Application Priority Data

Jun. 10, 2021 (EP) .................................. 21178706

(51) Int. Cl.
*H04N 25/47* (2023.01)

(52) U.S. Cl.
CPC .................................. *H04N 25/47* (2023.01)

(58) Field of Classification Search
CPC ...... H04N 25/47; H04N 23/60; H04N 23/617; H04N 23/70; H04N 25/707; H04N 17/002
See application file for complete search history.

(56) References Cited

U.S. PATENT DOCUMENTS

2014/0368712 A1  12/2014 Park et al.
2021/0174092 A1*  6/2021 Zhao .................... G06T 3/40

FOREIGN PATENT DOCUMENTS

| CN | 110390685 B | 3/2021 |
| KR | 10-2021-0031269 A | 3/2021 |
| WO | 2021/049730 A1 | 3/2021 |

OTHER PUBLICATIONS

V2E: From video frames to realistic DVS event camera streams (Tobi Delbruck et al.) (Year: 2020).*
(Continued)

*Primary Examiner* — Yogesh K Aggarwal
(74) *Attorney, Agent, or Firm* — XSENSUS LLP

(57) ABSTRACT

The present disclosure relates to a method for characterizing a dynamic vision sensor, DVS, comprising converting frames of a scene generated by an image sensor into events of the scene based on conversion parameters characterizing the DVS. The method further comprises determining a difference between the converted events and events corresponding to the scene detected by the DVS. The method further comprises adjusting the conversion parameters to reduce the difference between the converted and the detected events.

20 Claims, 7 Drawing Sheets

(56) References Cited

OTHER PUBLICATIONS

International Search Report and Written Opinion mailed on Oct. 5, 2022, received for PCT Application PCT/EP2022/064696, filed on May 31, 2022, 9 pages.
Teixeira et al., "Address-Event Imagers for Sensor Networks: Evaluation and Modeling", IPSN'06, Apr. 19-21, 2006, 10 pages.
Liu et al., "High-speed video generation with an event camera", Visual Computer, vol. 33, No. 6, May 10, 2017, pp. 749-759.
Delbruck et al., "V2E: From video frames to realistic DVS event camera streams", arXiv:2006.07722v1, Jun. 13, 2020, pp. 1-11.

* cited by examiner

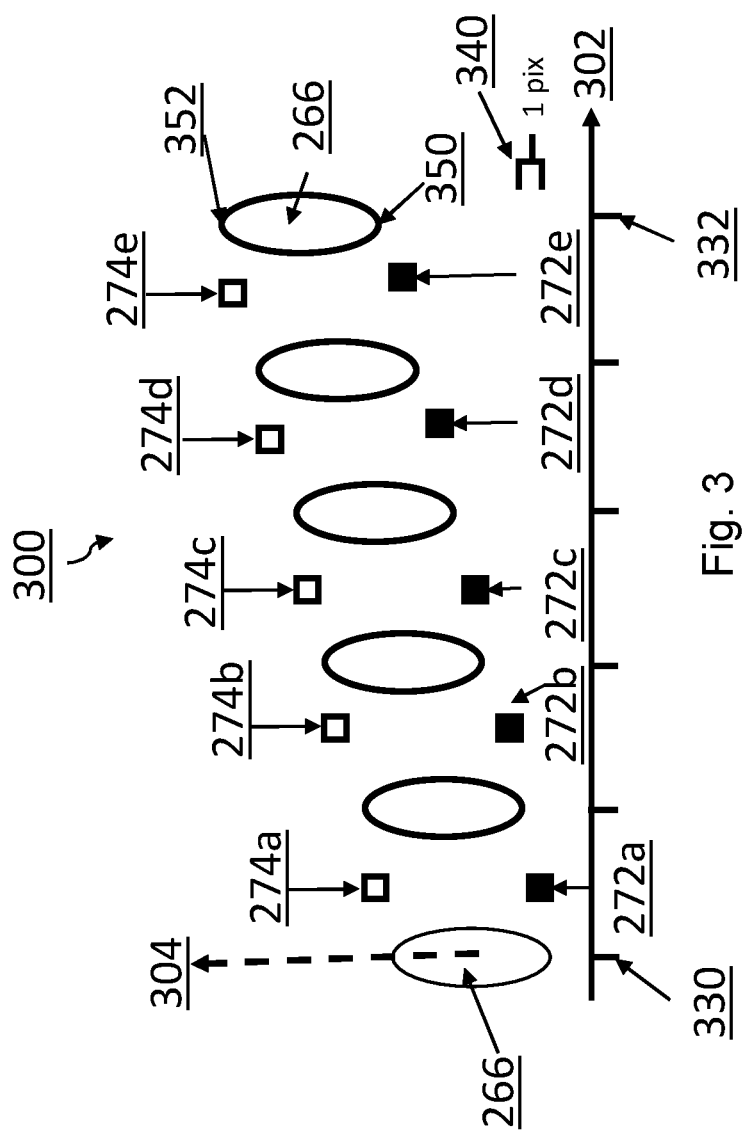

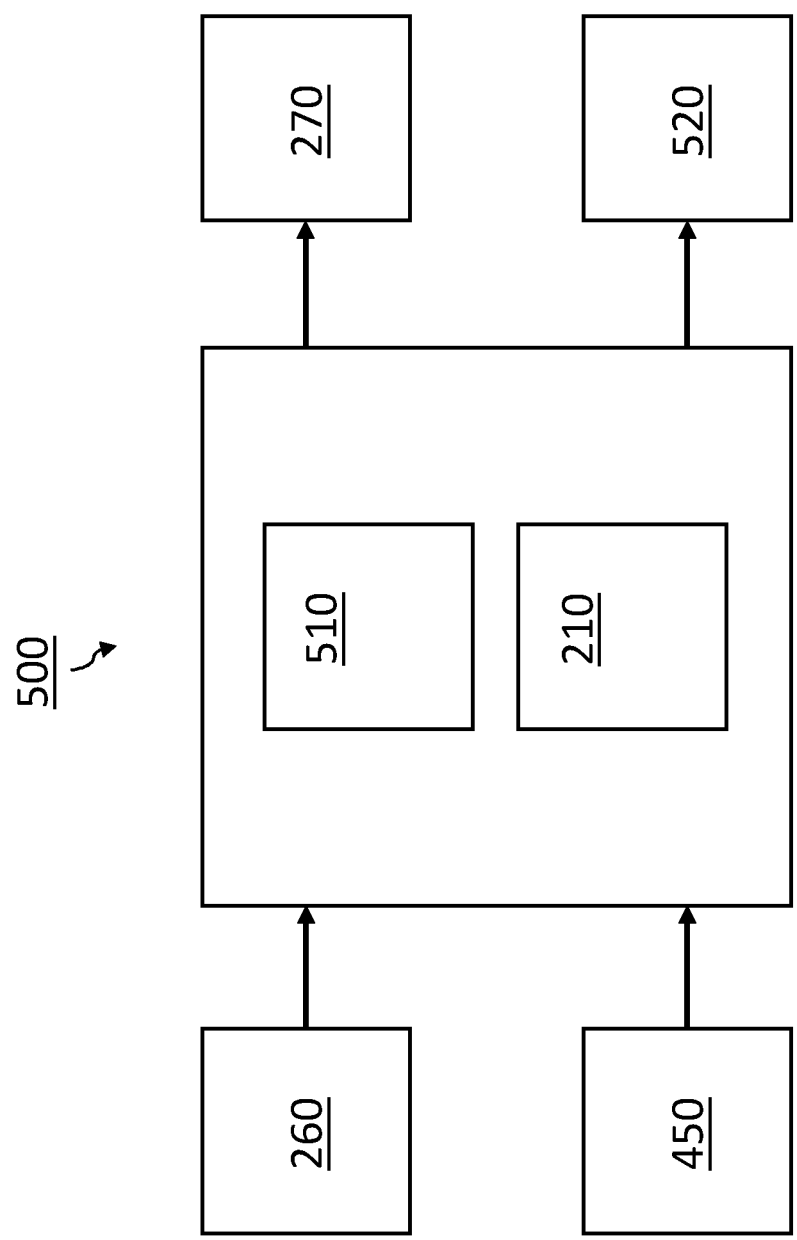

METHOD AND APPARATUS FOR CHARACTERIZING A DYNAMIC VISION SENSOR

CROSS-REFERENCE TO RELATED APPLICATIONS

The present application is based on PCT filing PCT/EP2022/064696, filed May 31, 2022, which claims priority from European Patent Application No. 21178706.4, filed Jun. 10, 2021, the entire contents of each are incorporated herein by reference.

FIELD

Examples of the present disclosure relate to a method and an apparatus for characterizing a dynamic vision sensor based on a computer-implemented model of the dynamic vision sensor.

BACKGROUND

Dynamic vision sensors (DVS), also sometimes referred to as Event-based Vision Sensors (EVS), are used in various technical applications, e.g., robotics, surveillance and automotive applications. According to its basic principle, a DVS detects so-called "events" when an illumination and, thus, a light stimulus of a pixel of the DVS changes.

The multitude of underlying physical parameters and operating parameters (settings) of the DVS depend on manufacturing processes, temperature and scene illumination. Their parameters present non-linear relationships. Therefore, it is difficult to extract a characterization of the DVS based on conventional analyses.

SUMMARY

A need for improvement is addressed by the subject matter of the independent claims. Further, possibly advantageous examples are addressed by the dependent claims.

According to a first aspect of the present disclosure, it is provided a method for characterizing a dynamic vision sensor, DVS. The method comprises converting frames of a scene generated by an image sensor into events of the scene based on conversion parameters characterizing the DVS. The method further comprises determining a difference between the converted events and events corresponding to the scene detected by the DVS. The method further comprises adjusting the conversion parameters to reduce the difference between the converted and the detected events.

In some examples, converting the frames of the scene into the events of the scene comprises interpolating, for at least one of the frames, between a light intensity of said frame and a light intensity of a subsequent frame.

In some examples, the conversion parameters indicate at least one of optics, photoconversion, circuitry model, threshold, bandwidth, refractory period, bias voltage, bias current, transistor-level characteristics of the DVS.

In some examples, converting the frames of the scene into the events of the scene comprises initializing the conversion parameters based on a physical model of the DVS.

In some examples, determining the difference between the converted and the detected events comprises determining a data rate and noise of the converted events. Determining the difference between the converted and the detected events may further comprise comparing the data rate and the noise of the converted events with a data rate and a noise of the detected events.

In some examples, determining the difference between the converted and the detected events comprises determining a temporal and spatial correlation of the converted events and the detected events.

In some examples, adjusting the conversion parameters comprises use of an optimization technique, such as simplex methods, evolutionary optimization, or gradient-based approaches to reduce the difference between the converted and the detected events.

In some examples, the method further comprises selecting an optimization target, adjusting the conversion parameters to match the optimization target for the scene and tuning the DVS based on the adjusted conversion parameters.

In some examples, the optimization target indicates at least one of signal to noise characteristics, classification accuracy, detection accuracy, latency, sensitivity.

In some examples, the image sensor is a high dynamic range complementary metal-oxide-semiconductor camera.

In some examples, converting the frames of the scene into the events of the scene comprises conducting light of the scene via a splitter to the DVS and to the image sensor.

In some examples, converting the frames of the scene into the events of the scene comprises focusing light of the scene in a lens shared by the DVS and the image sensor.

In some examples, converting the frames of the scene into the events of the scene comprises focusing light of the scene conducted to the DVS in a first lens and the light of the scene conducted to the image sensor in a second lens.

According to a second aspect of the present disclosure, it is provided an apparatus for characterizing a DVS. The apparatus comprises processing circuitry configured to convert frames of a scene generated by an image sensor into events of the scene based on conversion parameters characterizing the DVS. The apparatus is further configured to determine a difference between the converted events and events corresponding to the scene detected by the DVS. The apparatus is further configured to adjust the conversion parameters to reduce the difference between the converted and the detected events.

BRIEF DESCRIPTION OF THE FIGURES

Some examples of apparatuses and/or methods will be described in the following by way of example only, and with reference to the accompanying figures, in which
FIG. 3 illustrates a spatio-temporal distribution of converted events;
FIG. 5 illustrates an apparatus for characterizing the DVS.

DETAILED DESCRIPTION

Figure 1:
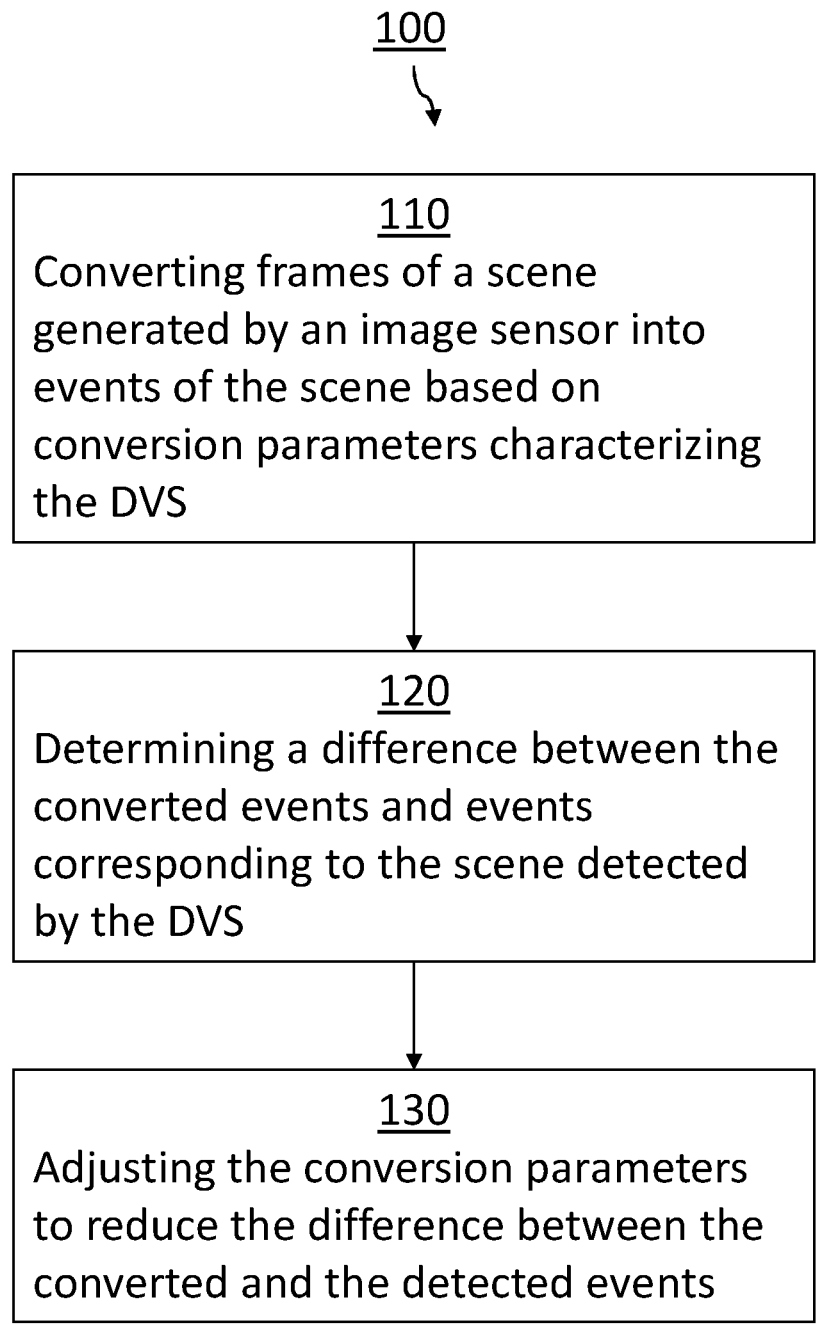
FIG. 1 illustrates a method for characterizing a DVS.

Some examples are now described in more detail with reference to the enclosed figures. How-ever, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

While image sensors of conventional cameras record frames of a scene synchronously, i.e., at regular intervals, e.g., every 33 ms (milliseconds), at full or partial resolution of the physical pixel matrix, dynamic vision sensors (DVS) of event cameras may react to light intensity (brightness) changes of a scene asynchronously in space and time. A signal, called event, may report a change of per-pixel light intensity by a certain threshold. The signal may contain pixel coordinates, a timestamp and polarity of an event occurrence, or in some in-stances, intensity information such as intensity difference. Due to the asynchronous operation of the DVS, timestamp resolution of modern event cameras may reach 1 μs (microseconds). The polarity may be a binary flag showing whether the light intensity at a given pixel has increased or decreased.

The DVS may offer a higher dynamic range and sparse as well as quicker output in comparison to conventional cameras which may make them useful for vision in fast changing environments and under uncontrolled lighting encountered in robotics, surveillance and mobile applications. The high-quality output from image sensors of conventional cameras may rely on effort in optimizing operating parameters such as column converter gain, noise filtering, exposure time, white balance, FPN (fixed-pattern noise) correction, white/dark pixel removal, aperture control, and focus control. There may be no similar approach to adjust operating parameters of a DVS.

Thus, an objective of the present disclosure may be providing a concept for characterizing a DVS.

FIG. 1 illustrates a method 100 for characterizing a DVS. The method 100 comprises converting 110 frames of a scene generated by an image sensor into events of the scene based on conversion parameters characterizing the DVS. The method 100 further comprises determining 120 a difference between the converted events and events corresponding to the scene detected by the DVS. The method 100 further comprises adjusting 130 the conversion parameters to reduce the difference between the converted and the detected events.

Figure 2:
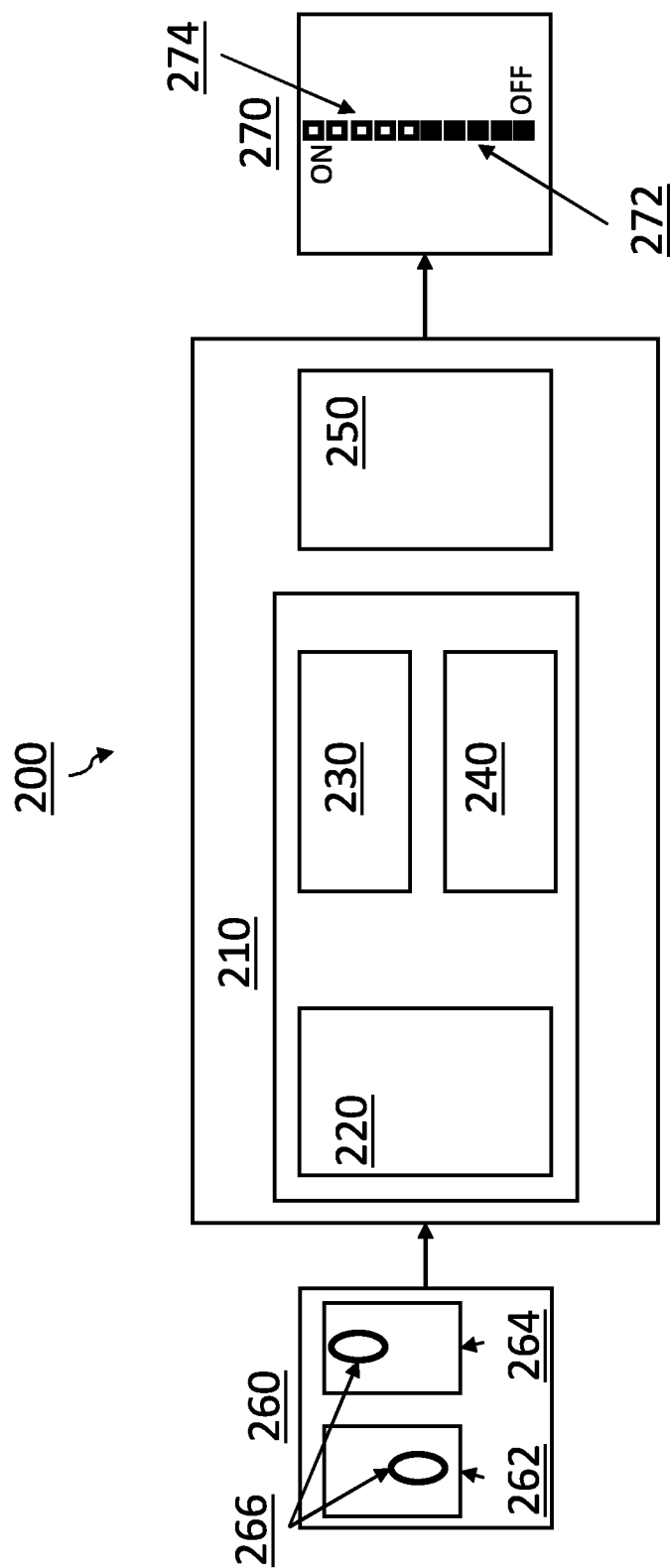
FIG. 2 illustrates a scheme of a DVS model.

For converting 110 the frames of the scene into the events, the method 100 may provide a DVS model emulating the DVS to extract physical and operating parameters of the DVS. The DVS model 200 may be a computer program executed on a computer system. The physical and operating parameters may be derived from the conversion parameters which may be in-ternal parameters of the DVS model. FIG. 2 illustrates a scheme of the DVS model 200. Firstly, the DVS model 200 may comprise a physically constrained model 210 indicating the physical parameters including optics 220, photoconversion processes 230, and a circuitry model 240 with transistor-level characteristics of the DVS and may consider non-idealities and noise. The optics 220 may refer to an optical model of the DVS and a respective event camera. The optics 220 may consider an absolute light intensity of the scene, a distance of the scene to the sensor, a lens distortion of a lens in the event camera, a DVS size and pixel characteristics. The photoconversion processes 230 may be modelled by integrating a photo diode into the circuitry model 240. The circuitry model 240 may represent a pixel circuit of the DVS comprising a model of an active-pixel sensor, a logarithmic photoreceptor, a source-follower, a switched-capacitor amplifier, and on/off-comparators, wherein the latter may indicate the polarity of an event. The polarity may indicate if a light intensity of light arriving at the photo diode either darkened (off-event) or brightened (on-event) within a predefined time interval and with a predefined threshold of light intensity change. The circuitry model 240 may further model parasitics, leaks, thermal disturbances, flicker and noise in the circuit. The conversion parameters of the DVS model 200 may be initialized with average values. Lower and upper bounds for the conversion parameters may be set to constraint them to physically possible limits. The DVS model 200 may also consider operating parameters 250 which are usually configurable by a user of the event camera, such as (event) threshold, (photoreceptor) bandwidth, refractory period, bias voltage, bias current of the DVS. The threshold may indicate a temporal contrast of the light intensity which is needed to throw an event and a sensitivity of the photo diode. The refractory period may correspond to a dead time between events, i.e., no new events may be triggered during the dead time. The bias voltage and bias current may enable to control an operation of amplifiers, the photo diode, the transistors, or comparators of the circuit, for instance. The DVS model 200 may use the conversion parameters for optimization from which the physical and operating parameters may be derived.

Secondly, the DVS model 200 may have frames 260 of a scene as an input and events 270 of the scene as an output. The DVS model may convert the frames 260 generated by an image sensor into events 270. The frames 260 may relate to still images at certain times (determined by a framerate of the image sensor) which compose a moving picture of the scene. In one frame 262 and a temporally subsequent frame 264 of the frames 260, there may be shown an object 266 moving linearly upwards. The movement of the object 266, thus, results into a shifted position in the frame 264 compared to frame 262. The events 270 may relate to the above-mentioned signals indicating a change in light intensity of the scene over time. The events 270 may be on- or off-events as indicated by filled circles 272 or open circles 274, respectively. By comparing a light intensity of one frame 262 shot at a first time with a subsequent frame 264 shot at a second time, a change of light intensity over a resulting time interval may be determined and events for the second time may be generated accordingly and with consideration of a threshold of light intensity which needs to be exceeded to throw an event. Normally, the framerate of the image sensor may be smaller than an event-rate of a DVS. In other words, the image sensor may not be able to provide enough frames to generate a realistic event stream. The DVS model 200 may therefore interpolate missing event information between the one frame and the subsequent frame. FIG. 3 illustrates a spatio-temporal distribution 300 of converted on-events 272*a-e* and off-events 274*a-e* inferred from the frames 262 and 264, wherein the converted events 272*a-e* and 274*a-e* are distributed over a time axis 302 and along a direction 304. In this case, the scene recorded by the image sensor may show the object 266 linearly moving in the direction 320 between the first point of time 330 when the frame 262 was taken by the image sensor and the second point of time 332 when the frame 264 was taken. The converted on-events 272*a-e* and the converted off-events 274*a-e* are rep-resented by a filled or empty square, respectively, with the side length of one pixel 340.

As the object 266 is moving and changing a light hitting the image sensor, a light intensity of the scene at the second point of time 332 may differ from a light intensity of the scene at the first point of time 330. For instance, a first part 350 of the frame 264 may be brighter (as the object 266 may not cover a background light at the first part 350 anymore) and a second part 352 of the frame 264 may be darker (as the object 266 may then cover the background light at the second part 352) than corresponding parts of the frame 262. In this case, the DVS model 200 may generate the converted on-event 272*e* and the converted off-event 274*e*, respectively, for the pixels in the said parts of the frame and for the second point of time 332. The DVS model 200 may further generate the converted events 272*a* and 274*a* by comparing the frame 262 with a previous frame (not shown). The DVS model 200 may then generate the converted events 272*b-d* and 274*b-d* by interpolating between the given converted events 272*a*, 274*a* and 272*e*, 274*e*.

Referring back to the method 100, a second step is determining 120 a difference between the converted events 270 (events generated by the DVS model 200) and events corresponding to the scene detected by the DVS. As the converted events 270 and the detected events may both refer to the same scene, it may be necessary to align the image sensor and the DVS, such that they simultaneously record the scene from a predefined angle.

Figure 4A:
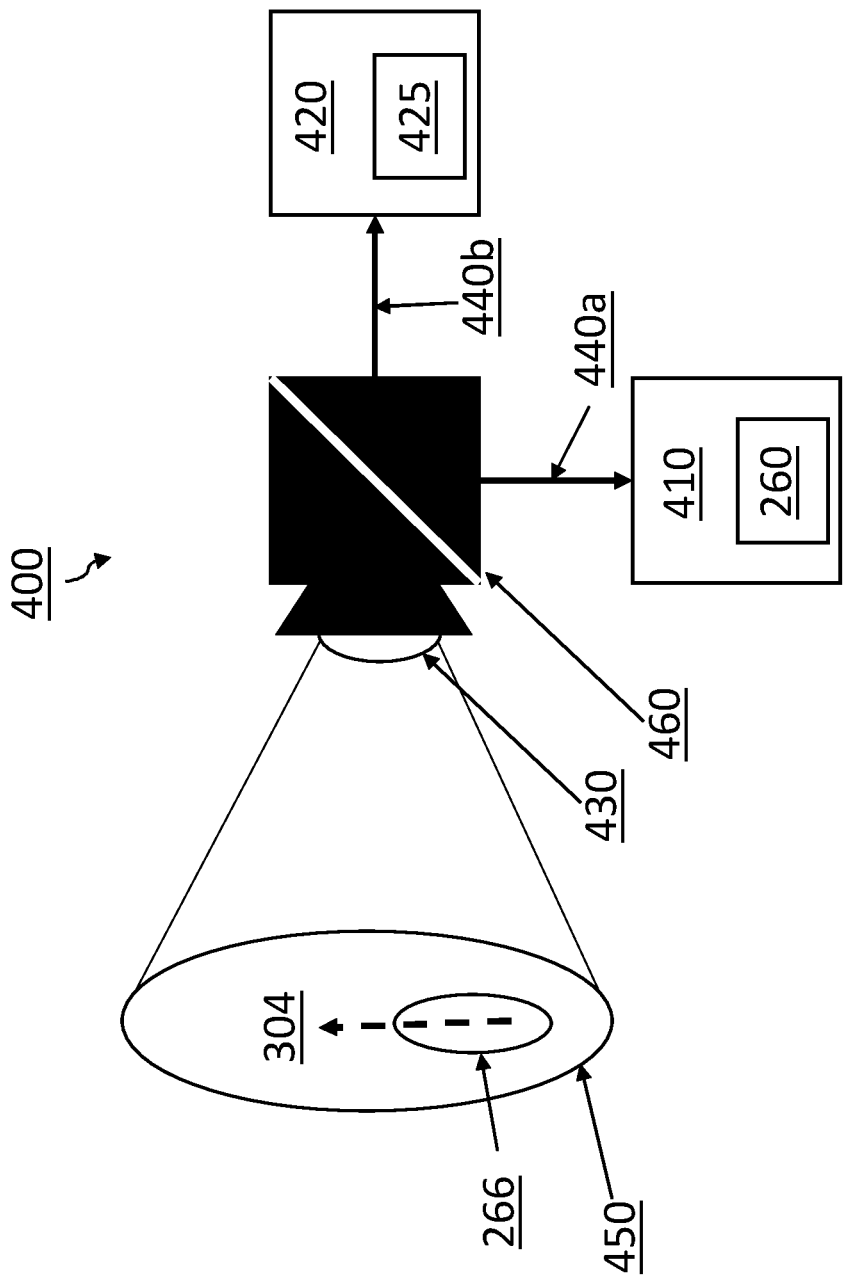
FIG. 4a,b illustrate a camera setup for aligning an image sensor and the DVS.
Figure 4B:
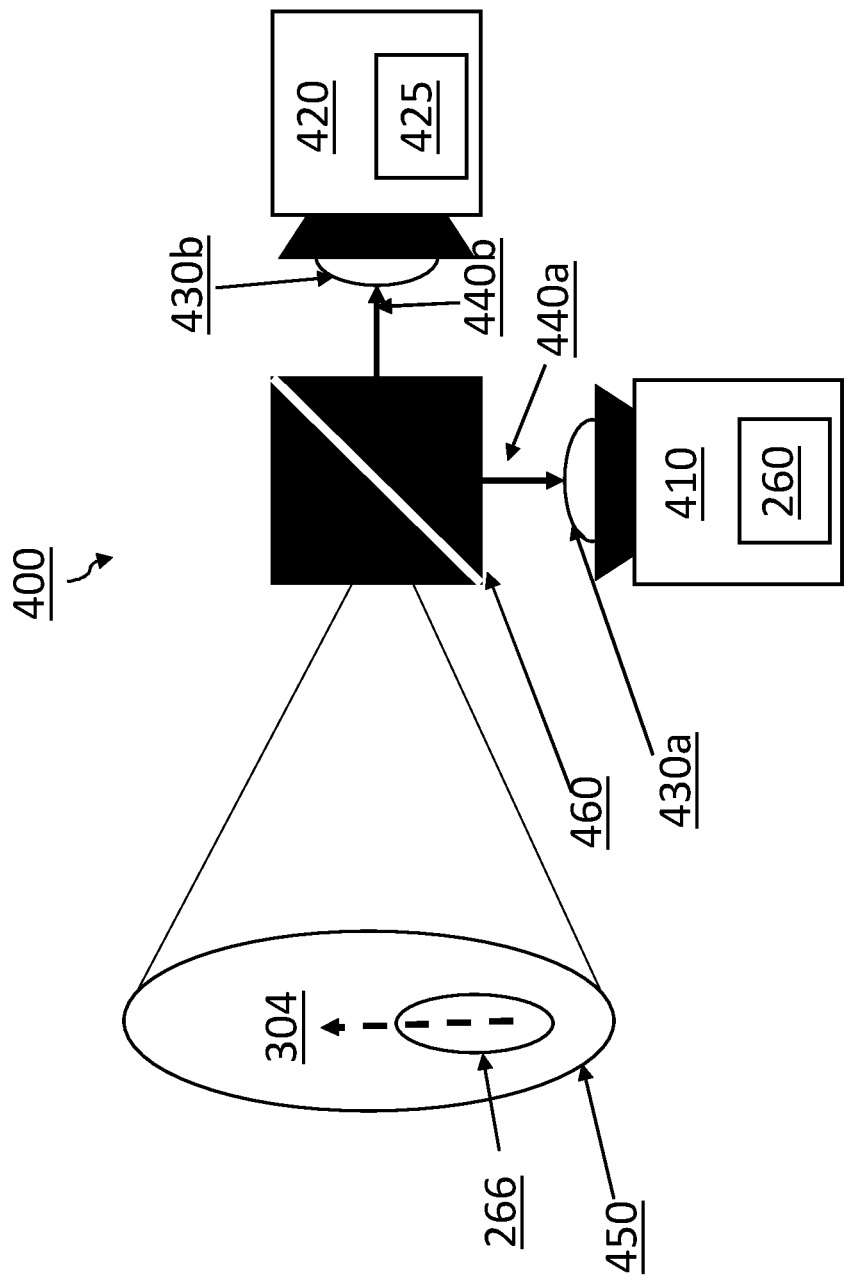

FIG. 4*a* and FIG. 4*b* illustrate two examples of a camera setup 400 for aligning an image sensor 410 and a DVS 420. The image sensor 410 may be a conventional CMOS (Complementary Metal-Oxide Semiconductor) sensor generating high framerate, high quality, HDR frames. In a first setup, shown in FIG. 4*a*, the image sensor 410 and the DVS 420 share a common focusing lens 430. The image sensor 410 receives a light beam 440*a* and the DVS receives a light beam 440*b*. The light beams 440*a*, 440*b* may be approximately equivalent and show a dynamic scene 450 with the object 266 moving in the direction 304. Such simple stimuli in the scene 450 may be advantageous for initial calibrations of the DVS 420. Light of the scene 440 may be transmitted through the lens 430 to an optical 50/50 beam splitter 460. The beam splitter 460 may (ideally) transmit half of the light and reflect another half of the light towards the image sensor 410 and the DVS 420, respectively. The image sensor 410 may generate the frames 260 of the scene 450, whereas the DVS may generate detected events 425 of the scene 450. Due to the shared lens 430 a light distortion may be equal for the image sensor 410 and the DVS 420. Thus, the first setup may ease data alignment between the image sensor 410 and the DVS 420. In a second setup, shown in FIG. 4*b*, the common lens 430 is replaced by a first lens 430*a* in front of the image sensor 440 and a second lens 430*b* in front of the DVS 420. The second setup may meet requirements on lens quality more easily than in the first setup, as the image sensor 410 and the DVS 420 may be equipped with and adjusted to the first lens 430*a* and the second lens 430*b*, respectively, from manufacturer side. Alternatively, the scene 450 may be duplicated and the image sensor 410 and the DVS 420 may record the scene 450 successively in an aligned view angle.

Via a data interface, the frames 260 and the detected events 425 may be transferred to an apparatus 500 for characterizing the DVS 420, as shown in FIG. 5. The apparatus 500 may comprise processing circuitry 510 to convert the frames 260 of the scene 450 generated by the image sensor 410 into events 270 of the scene 450 based on the conversion parameters 210 characterizing the DVS 420. This may correspond to an execution of the above-mentioned DVS model 200. The apparatus 500 may determine a difference between the converted events 270 and the events 425 corresponding to the scene 450 detected by the DVS 420. For this purpose, the converted events 270 and the detected events 425 may be processed statistically to compare noise and data rates of the image sensor 410 and the DVS 420. Additionally or alternatively, a temporal and spatial correlation of the converted events 270 and the detected events 425 may be determined. The apparatus 500 may adjust the conversion parameters 210 to reduce the difference between the converted events 270 and the detected events 425. An optimization algorithm, e.g., a simplex method, evolutionary optimization, or gradient-based methods, may be used to reduce the difference between the converted events 270 and the detected events 425. The conversion parameters 210 may be changed according to the optimization algorithm. The adjustment of the conversion parameters 210 may be repeated until the difference between the converted events 270 and the detected events 425 is small enough, i.e., it lies within predefined acceptance boundaries.

This approach may be used in an industrial scenario to characterize first versions of the DVS 420. Thus, intrinsic parameters 520 of the DVS 420 may be retrieved from the conversion parameters 210 to check if the DVS 420 achieve specifications. The intrinsic parameters 520 may then be expressed in a datasheet. Such a datasheet may be used for verifying a quality of the DVS 420 during a manufacturing process or for creating a specification of the DVS 420 which may be useful to end users of the DVS 420. Later versions of the DVS 420 may require a shorter optimization of the conversion parameters 210 since the conversion parameters 210 may already be initialized with realistic values from previous optimizations.

Figure 6:
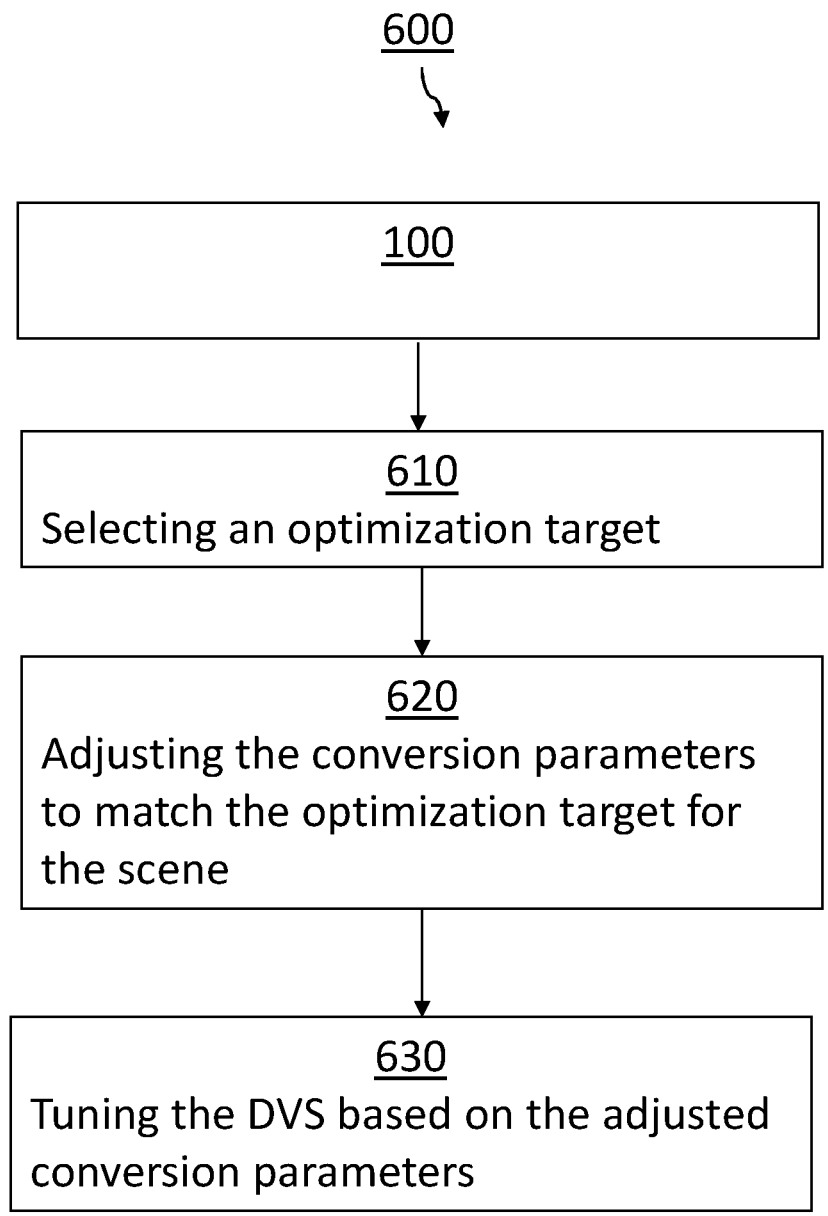
FIG. 6 illustrates a method for tuning the DVS.

Alternatively, the conversion parameters 210 may further be used for tuning the DVS 420. The conversion parameters 210 may therefore optimized such that the DVS model 200 achieves a predefined optimization target. The optimized conversion parameters 210 may be used to adjust operating parameters of the DVS 420. This may also be useful for end-to-end optimization of machine vision systems based on the DVS 420, e.g., for detection, recognition, or prediction use cases. Corresponding machine learning models may be optimized towards a predefined classification accuracy. FIG. 6 shows a method 600 for tuning the DVS 420. The method 600 comprises the steps 110 to 130 of method 100 (summarized as block 100). It further comprises selecting 610 an optimization target. The optimization target may indicate a desired signal to noise characteristics, latency, or sensitivity of the DVS 420. A performance criterion, such as cross-entropy loss for classification or mean squared error for regression, may also be selected for the machine learning model. The method 600 may further comprise adjusting 620 the conversion parameters 210 to match the optimization target for the scene 450. Adjusting 620 may comprise using a backpropagation method for the machine learning model. The scene 450 may comprise complex stimuli like natural videos (for unsupervised learning, for instance) or synthetic images. The stimuli may comprise ground-truth labels if the performance criterion requires it. The method 600 may further comprise tuning 630 the DVS 420 based on the adjusted conversion parameters 210. An output of the method 600 may be a bias voltage or current, for instance, which may correspond to the optimization target. The bias voltage or current may be adjusted in settings of the DVS 420.

To summarize, a realistic DVS model 200 may be provided to simulate a DVS 420. Based on bound optimization, for instance, conversion parameters 210 of the DVS model 200 may be adjusted to match physical and operating parameters of the DVS 420. The parameters of the DVS model 200 may be extracted for characterizing the DVS 420. Additionally, (adjustable) operating parameters of the DVS 420 may be finetuned by optimizing the conversion parameters 210 in a simulation.

Note that the present technology can also be configured as described below.

(1) Method for characterizing a dynamic vision sensor, DVS, comprising:
  converting frames of a scene generated by an image sensor into events of the scene based on conversion parameters characterizing the DVS;
  determining a difference between the converted events and events corresponding to the scene detected by the DVS; and
  adjusting the conversion parameters to reduce the difference between the converted and the detected events.

(2) Method of (1), wherein converting the frames of the scene into the events of the scene comprises interpolating, for at least one of the frames, between a light intensity of said frame and a light intensity of a subsequent frame.

(3) Method of (1) or (2), wherein the conversion parameters indicate at least one of optics, photoconversion, circuitry model, threshold, bandwidth, refractory period, bias voltage, bias current, transistor-level characteristics of the DVS.

(4) Method of any of (1) to (3), wherein converting the frames of the scene into the events of the scene comprises initializing the conversion parameters based on a physical model of the DVS.

(5) Method of any of (1) to (4), wherein determining the difference between the converted and the detected events comprises:
  determining a data rate and noise of the converted events; and
  comparing the data rate and the noise of the converted events with a data rate and a noise of the detected events.

(6) Method of any of (1) to (5), wherein determining the difference between the converted and the detected events comprises:
  determining a temporal and spatial correlation of the converted events and the detected events.

(7) Method of any of (1) to (6), wherein adjusting the conversion parameters comprises using an optimization algorithm comprising at least one of a simplex method, evolutionary optimization, or gradient-based optimization to reduce the difference between the converted and the detected events.

(8) Method of any of (1) to (7), further comprising:
  selecting an optimization target;
  adjusting the conversion parameters to match the optimization target for the scene; and
  tuning the DVS based on the adjusted conversion parameters.

(9) Method of (8), wherein the optimization target indicates at least one of signal to noise characteristics, classification accuracy, detection accuracy, latency, sensitivity.

(10) Method of any of (1) to (9), wherein the image sensor is a high dynamic range complementary metal-oxide-semiconductor camera.

(11) Method of any of (1) to (10), wherein converting the frames of the scene into the events of the scene comprises conducting light of the scene via a splitter to the DVS and to the image sensor.

(12) Method of any of (1) to (11), wherein converting the frames of the scene into the events of the scene comprises focusing light of the scene in a lens shared by the DVS and the image sensor.

(13) Method of any of (1) to (12), wherein converting the frames of the scene into the events of the scene comprises focusing light of the scene conducted to the DVS in a first lens and the light of the scene conducted to the image sensor in a second lens.

(14) Apparatus for characterizing a dynamic vision sensor, DVS, comprising:
  processing circuitry configured to:
  convert frames of a scene generated by an image sensor into events of the scene based on conversion parameters characterizing the DVS;
  determine a difference between the converted events and events corresponding to the scene detected by the DVS; and
  adjust the conversion parameters to reduce the difference between the converted and the detected events.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The invention claimed is:

1. A method for characterizing a dynamic vision sensor, DVS, comprising:
   converting frames of a scene generated by an image sensor into events of the scene based on conversion parameters characterizing physical and operating parameters of the DVS, wherein the physical parameters include at least a circuitry model with transistor-level characteristics of the DVS;
   determining a difference between the converted events and events corresponding to the scene detected by the DVS; and
   adjusting the conversion parameters using an optimization algorithm to reduce the difference between the converted and the detected events until the difference is within predefined acceptance boundaries; and
   deriving a set of intrinsic parameters of the DVS from the adjusted conversion parameters to generate a datasheet for the DVS.

2. The method of claim 1, wherein converting the frames of the scene into the events of the scene comprises interpolating, for at least one of the frames, between a light intensity of said frame and a light intensity of a subsequent frame.

3. The method of claim 1, wherein the conversion parameters further indicate at least one of optics, photoconversion, threshold, bandwidth, refractory period, bias voltage, bias current.

4. The method of claim 1, wherein converting the frames of the scene into the events of the scene comprises initializing the conversion parameters based on a physical model of the DVS.

5. The method of claim 4, wherein the physical model is a physically constrained model of the DVS.

6. The method of claim 4, further comprising initializing the conversion parameters with average values constrained by lower and upper bounds corresponding to physically possible limits.

7. The method of claim 1, wherein determining the difference between the converted and the detected events comprises:
   determining a data rate and noise of the converted events; and
   comparing the data rate and the noise of the converted events with a data rate and a noise of the detected events.

8. The method of claim 1, wherein determining the difference between the converted and the detected events comprises:
   determining a temporal and spatial correlation of the converted events and the detected events.

9. The method of claim 1, wherein adjusting the conversion parameters comprises using at least one of a simplex method, evolutionary optimization, or gradient-based optimization to reduce the difference between the converted and the detected events.

10. The method of claim 1, further comprising:
    selecting an optimization target;
    adjusting the conversion parameters to match the optimization target for the scene; and
    tuning the DVS based on the adjusted conversion parameters.

11. The method of claim 10, wherein the optimization target indicates at least one of signal to noise characteristics, classification accuracy, detection accuracy, latency, sensitivity.

12. The method of claim 11, wherein the image sensor is a high dynamic range complementary metal-oxide-semiconductor camera.

13. The method of claim 10, wherein tuning the DVS comprises adjusting at least one of a bias voltage or a bias current of the DVS based on the adjusted conversion parameters.

14. The method of claim 1, wherein converting the frames of the scene into the events of the scene comprises conducting light of the scene via a splitter to the DVS and to the image sensor.

15. The method of claim 1, wherein converting the frames of the scene into the events of the scene comprises focusing light of the scene in a lens shared by the DVS and the image sensor.

16. The method of claim 1, wherein converting the frames of the scene into the events of the scene comprises focusing light of the scene conducted to the DVS in a first lens and the light of the scene conducted to the image sensor in a second lens.

17. Apparatus for characterizing a dynamic vision sensor, DVS, comprising:
    processing circuitry configured to:
    convert frames of a scene generated by an image sensor into events of the scene based on conversion parameters characterizing physical and operating parameters of the DVS, wherein the physical parameters include at least a circuitry model with transistor-level characteristics of the DVS;
    determine a difference between the converted events and events corresponding to the scene detected by the DVS; and
    adjust the conversion parameters using an optimization algorithm to reduce the difference between the converted and the detected events until the difference is within predefined acceptance boundaries.

18. The apparatus of claim 17, wherein the processing circuitry is further configured to:
    derive a set of intrinsic parameters of the DVS from the adjusted conversion parameters to generate a datasheet for the DVS.

19. The apparatus of claim 17, wherein the conversion parameters are part of a physically constrained model of the DVS.

20. The apparatus of claim 17, wherein the processing circuitry is further configured to initialize the conversion parameters with average values constrained by lower and upper bounds corresponding to physically possible limits.

* * * * *